Figure 2:
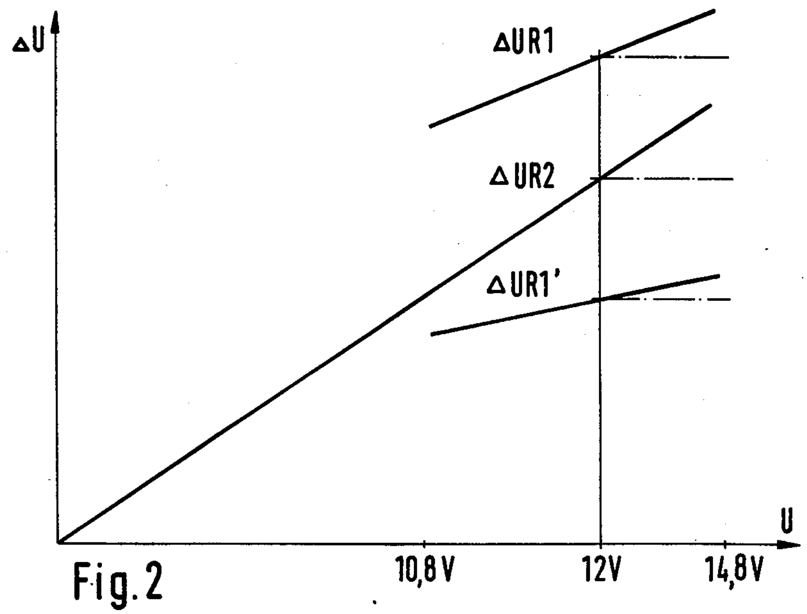

United States Patent [19]

Riba

[11] 4,173,750

[45] Nov. 6, 1979

[54] INCANDESCENT LAMP MONITORING DEVICE

[76] Inventor: Jutta Riba, Rosenbergstr. 26, 5455 Hardert, Fed. Rep. of Germany

[21] Appl. No.: 864,522

[22] Filed: Dec. 27, 1977

[30] Foreign Application Priority Data

Dec. 30, 1976 [DE] Fed. Rep. of Germany ....... 2659658

[51] Int. Cl.[2] ........................ B60Q 1/00; G08B 21/00

[52] U.S. Cl. ........................................ 340/80; 340/510; 340/642; 340/661

[58] Field of Search ................. 340/80, 510, 511, 641, 340/642, 652, 653, 52 D, 661; 307/10 LS; 315/134

[56] References Cited

U.S. PATENT DOCUMENTS

| | | | |
|---|---|---|---|
| 3,593,264 | 7/1971 | Atkins | 340/52 D |
| 3,736,560 | 5/1973 | Hart | 340/641 |
| 3,857,062 | 12/1974 | Leonard et al. | 340/641 X |
| 3,883,753 | 5/1975 | Harrison, Jr. et al. | 340/652 X |
| 3,984,676 | 10/1976 | Barbieri | 315/134 X |

OTHER PUBLICATIONS

"Applied Ideas", *Electronic Engineering,* Mar. 1977, p. 27.

*Primary Examiner*—Donald J. Yusko
*Attorney, Agent, or Firm*—Donald Brown

[57] ABSTRACT

A monitoring device for monitoring incandescent lamps, especially in motor vehicles, is provided. A measuring resistor is connected in series with an incandescent lamp to be monitored. Means for monitoring the voltage drop at the measuring resistor are provided. The monitoring means comprises an operational amplifier to one input of which the connection between the measuring resistor and the incandescent lamp is connected and to the other input of which a voltage divider is connected which is mounted in parallel with the measuring resistor and the incandescent lamp. The voltage divider is formed of ohmic resistors, and the output of the operational amplifier controls an indicator means for generating an indication signal upon missing or excessively low voltage drop at the measuring resistor.

18 Claims, 7 Drawing Figures

INCANDESCENT LAMP MONITORING DEVICE

BACKGROUND OF THE INVENTION

The invention relates to a monitoring device for monitoring lamps, especially in motor vehicles, comprising a measuring resistor connected in series with the incandescent lamp to be monitored and means for monitoring the potential drop at the measuring resistor.

The proper operation of the illumination in motor vehicles is of major importance to the security of the vehicle. Monitoring devices of the kind stated above have already been proposed for monitoring the operation of all essential illumination elements during driving. Regarding reliability, a high standard is requested from these monitoring devices. On the other hand, it is required that these monitoring devices may be produced at low costs, as otherwise they would not achieve the desired divulgation in as many motor vehicles as possible. Particular demands on a monitoring device of this kind are the following:

(a) an erroneous indication indicating that a defective lamp is still operating must be excluded;

(b) the readiness of operation of the monitoring device must be recognizable by simulating errors;

(c) a safe indication of malfunctions must be insured even in case of fluctuations from minus 20 to plus 25% of the voltage in the circuit of the motor vehicle;

(d) a maximum of 2.5% of the supply voltage may drop at the incandescent lamp to be monitored in the monitoring device;

(e) in spite of the relatively large resistance tolerances of incandescent lamps a safe indication of malfunction must be insured;

(f) in case of two parallel incandescent lamps to be monitored, when the total current to be monitored drops to 78% (with respect to the nominal power at testing voltage), no malfunction should be indicated;

(g) the safe indication of malfunction should be insured within a range of minus 40° to +90° C. of environment temperature;

(h) with an overload of the monitoring circuit with the 25 fold nominal current, a maximum of 25A, during 5 minutes, the device must still operate or become defective and indicate a malfunction.

OBJECT OF THE INVENTION

It is the object of the invention to provide a monitoring device for monitoring lamps which fulfills all of the above requirements.

SUMMARY OF THE INVENTION

The monitoring device for monitoring lamps comprises a measuring resistor connected in series with the lamp to be monitored and means for monitoring the potential drop across said measuring resistor. An operational amplifier has the junction between the measuring resistor and the incandescent lamp connected to one of its inputs, and a voltage divider formed of ohmic resistors is mounted in parallel with the measuring resistor and the lamp, the junction between said two ohmic resistors being connected to the other input of said operational amplifier and the output of the operational amplifier controlling an indicating means for providing an indication signal upon missing or excessively low voltage drop at the measuring resistor.

In accordance with a further embodiment of the invention and for monitoring a plurality of incandescent lamps with distinct current circuits, a plurality of monitoring devices are combined in one unit.

Advantageously, the unit comprises for each monitoring device a terminal for a switch, a terminal for a lamp circuit to be monitored, a control output for indicating or display means as well as a control terminal for a malfunction simulating means common to the monitoring devices and a control output for a common indicating or display means. Thus, the unit may generally perform various indicating and monitoring functions in accordance with the external mounting.

A particular advantage of the monitoring device of the invention is the fact that in case of two parallel incandescent lamps in one lamp circuit as is often the case with brake lights, failure of one of the incandescent lamps will provide a safe indication of mulfunction, by appropriate dimensioning of the voltage divider.

Figure 1:
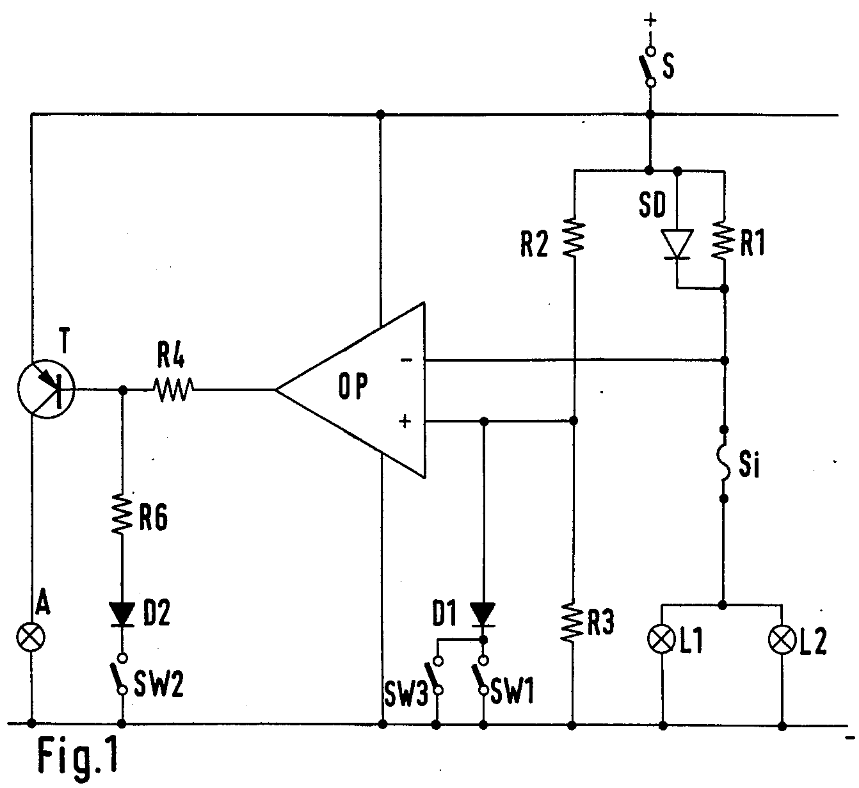
Figure 3:
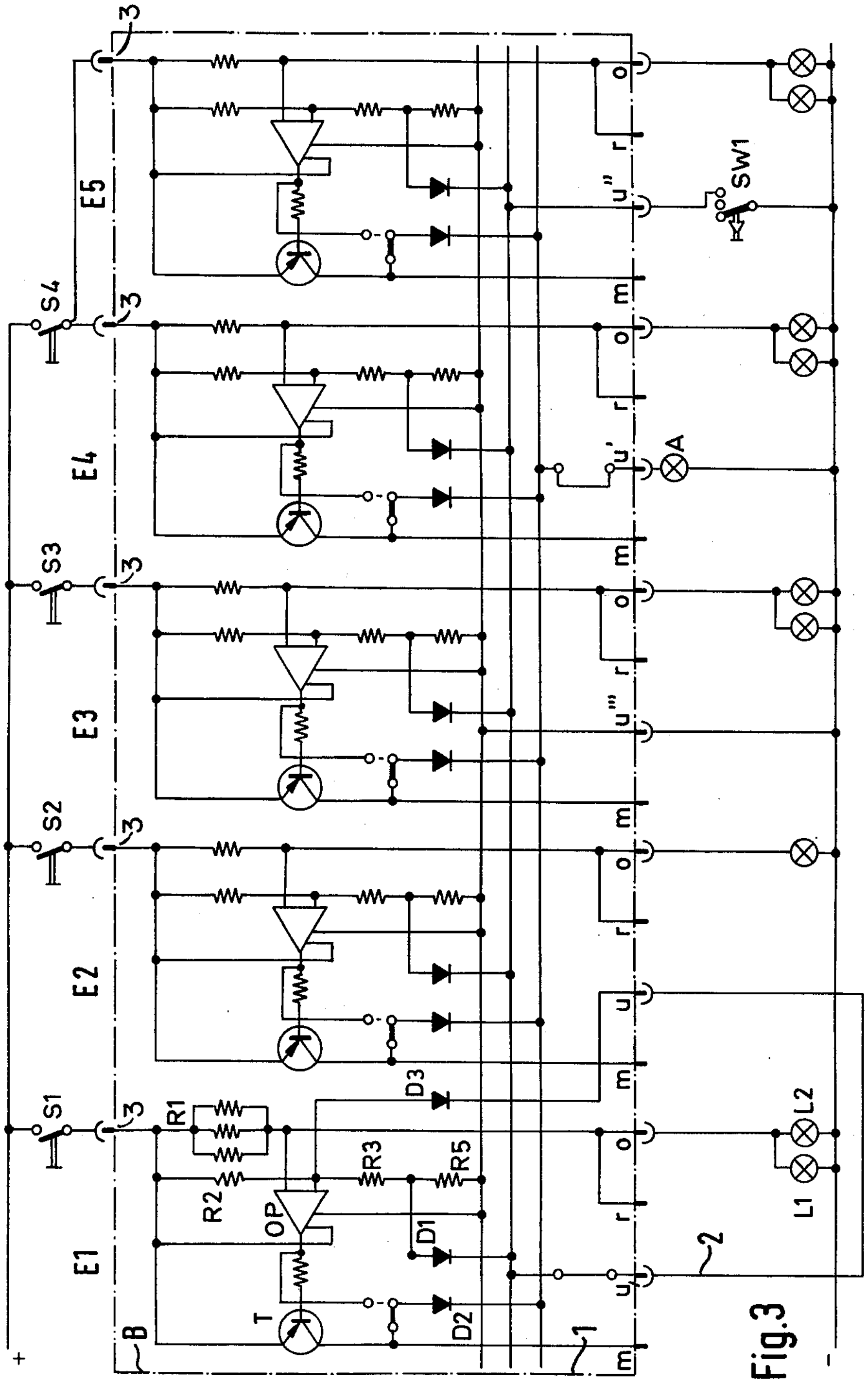
Figure 4:
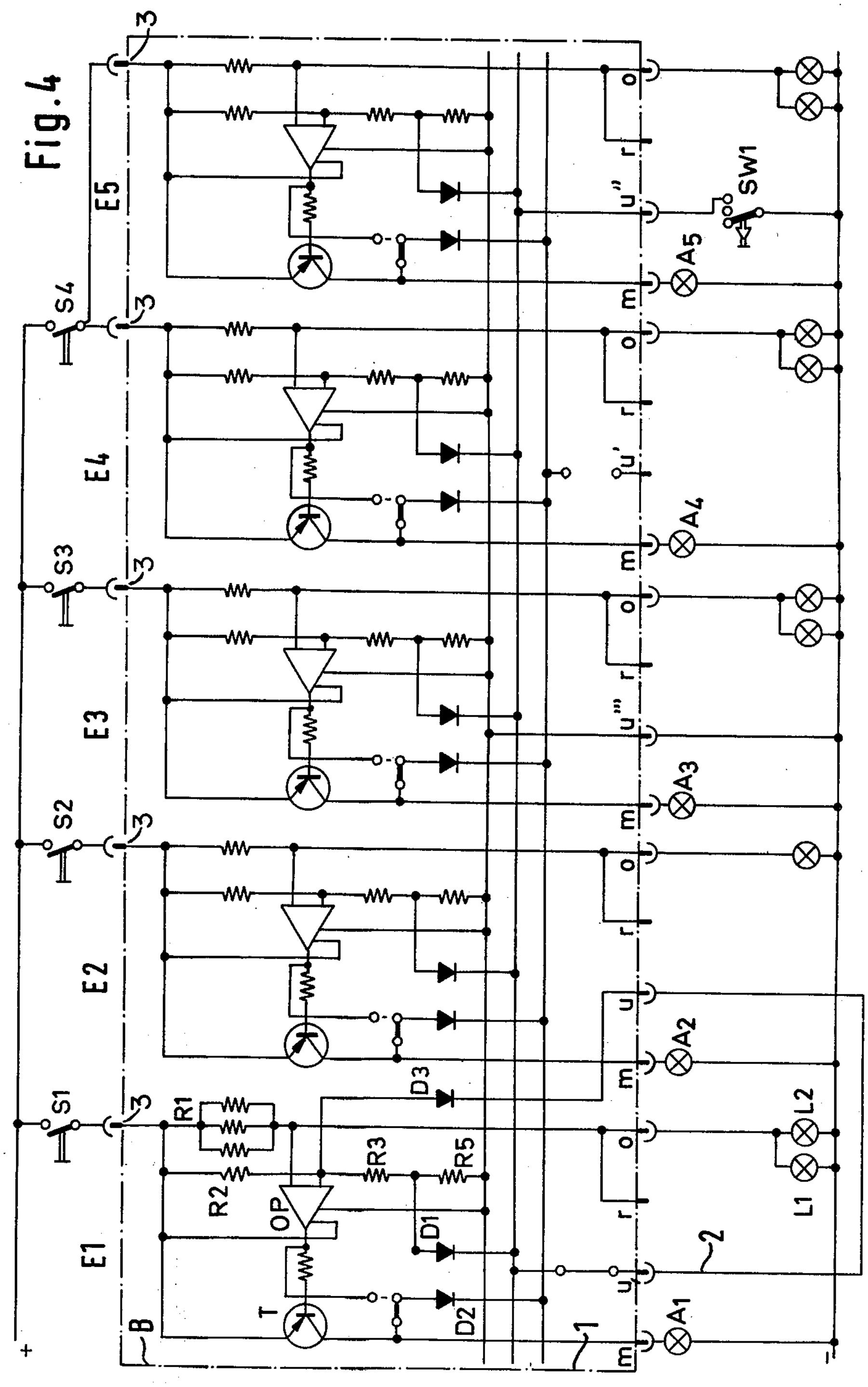
Figure 5:
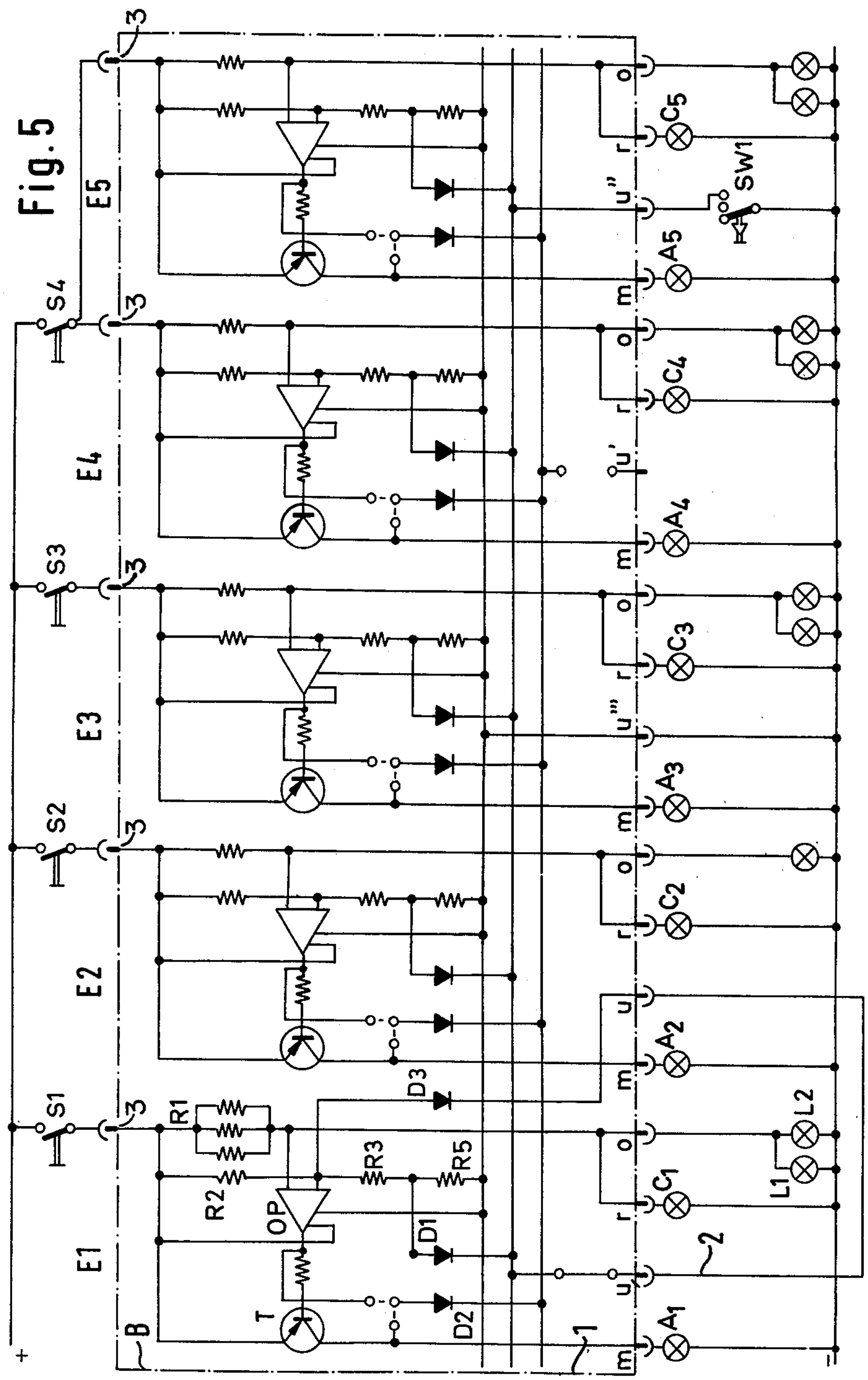
Figure 6:
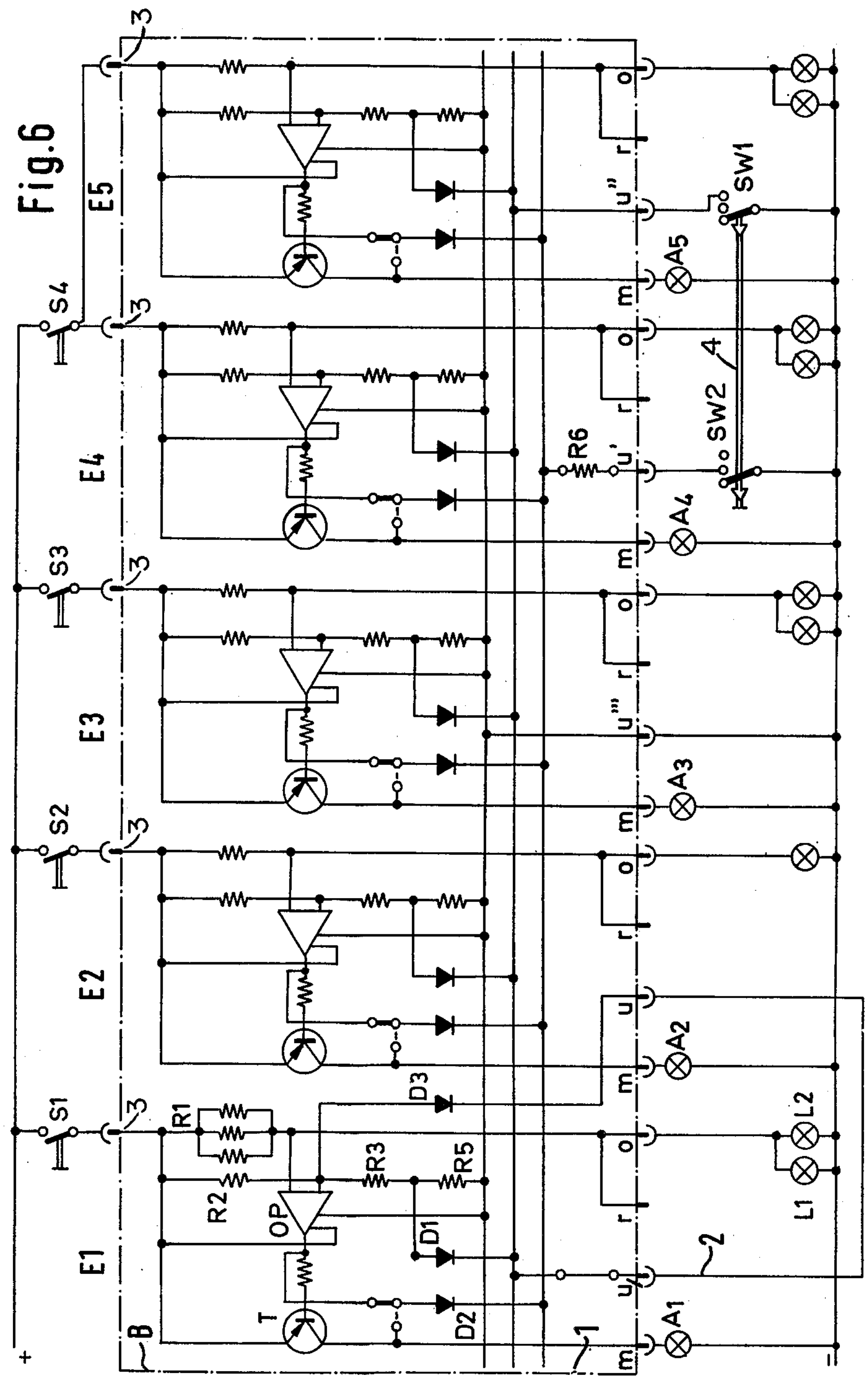
Figure 7:
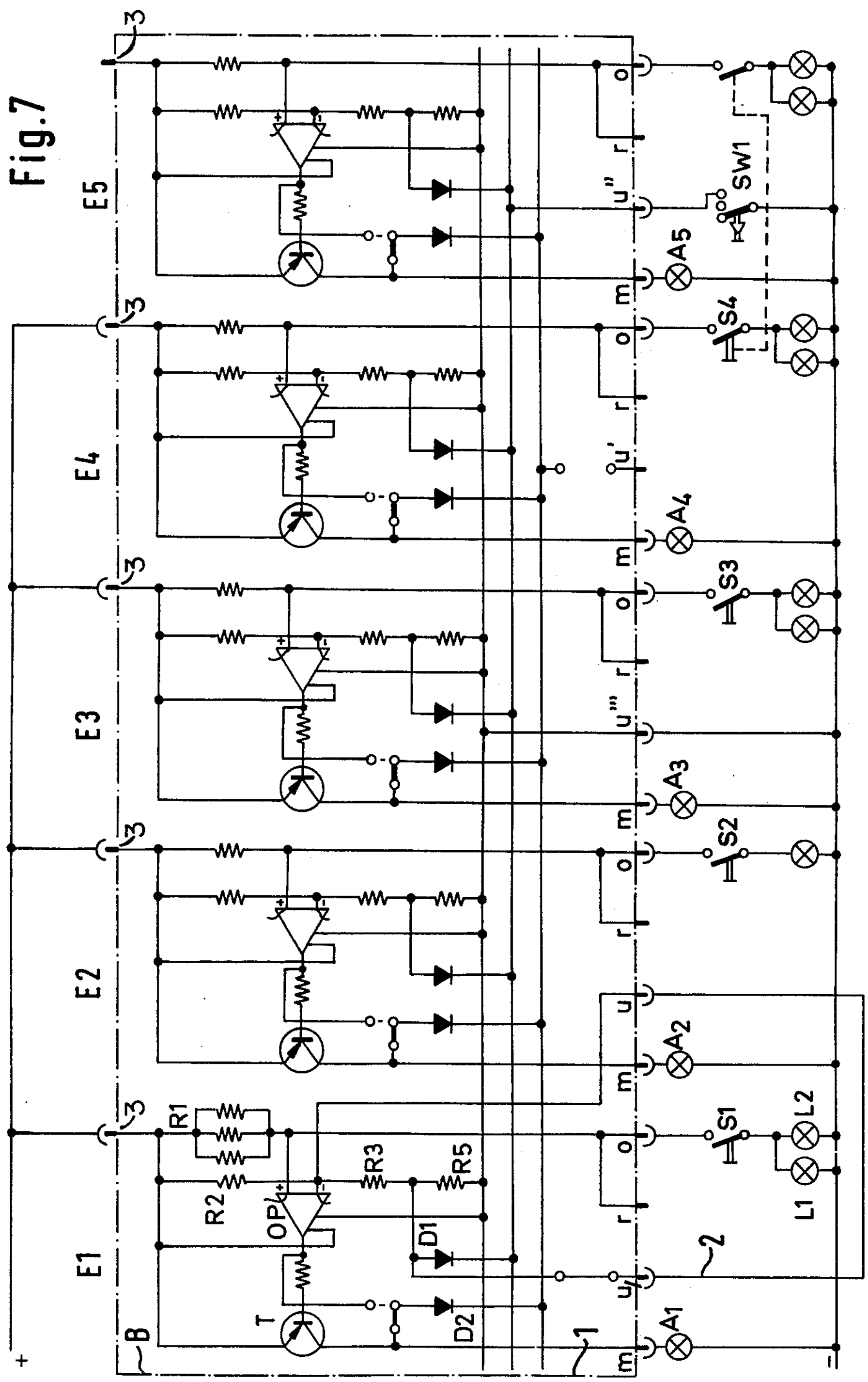

Further features and advantages of the invention stand out from the description of embodiments with respect to the figures. In the drawing:

FIG. 1 shows a schematic diagram of a monitoring means of the monitoring device;

FIG. 2 a diagram for explaining the operation of the monitoring means disclosed in FIG. 1;

FIG. 3 a diagram of one unit comprising a plurality of monitoring devices;

FIG. 4 a diagram of the unit shown in FIG. 3 with modified external mounting;

FIG. 5 a diagram of the unit shown in FIG. 3 but having a modified external mounting; and FIGS. 6 and 7 diagrams of the unit shown in FIG. 3 showing modified embodiments of the external and inner mountings, respectively.

The monitoring device diagramatically shown in FIG. 1 comprises a bridge circuit with a first bridge branch formed of a series connection of a measuring resistor R1 and two parallel mounted incandescent lamps L1, L2 to be monitored, and with a second bridge branch including a voltage divider formed of two series connected resistors R2, R3. One input of an operational amplifier OP is connected with the junction between the measuring resistor R1 and the lamps L1, L2, the second input of the operational amplifier being connected with the junction between the resistors R2 and R3. The output of the operational amplifier OP controls the base electrode of a transistor T through a resistor R4, the emitter electrode of the transistor being connected, as are resistor R2 and the measuring resistor R1, with the positive terminal of a supply voltage through a light switch S, and the collector electrode being mounted in series with an indicator lamp A and therethrough connected with the negative terminal of the supply voltage.

The operation of the circuit shown in FIG. 1 will now be explained by referring to FIG. 2. In FIG. 2, the voltage drop at resistors R1 and R2 is shown as a function of the supply voltage. The straight line indicated at $\Delta UR2$ shows the voltage or potential drop at resistor R2 and the straight line indicated at $\Delta UR1$ shows the voltage drop at measuring resistor R1 when current is drawn through both lamps L1, L2. The straight line indicated at $\Delta UR1'$ shows the voltage drop at measuring resistor R1 when one of both lamps L1, L2 has failed. When both lamps are operating the input indicated at "−" of the operational amplifier OP receives a lower voltage than the input indicated at "+". Thus, the output of the operational amplifier OP is positive and transistor T is blocked. The indicator lamp A remains dark. Should one of the lamps L1, L2 fail, the voltage at "−" input of the operational amplifier OP raises to a value which is higher than the voltage at "+" input, and the output of operational amplifier OP is thus negative and biases transistor T in its conductive state through resistor R4. This lights the indicator lamp A and indicates that one of the lamps has failed. When both lamps L1, L2 have failed or the current lead to these lamps is interrupted, no voltage drop at all is provided at measuring resistor R1 so that the voltage at the "−" input is substantially higher than the voltage at the "+" input and the indicator lamp A will likewise be lighted.

The voltage divider formed of resistors R2 and R3 can easily be dimensioned in such a way that the characteristic shown in FIG. 2 will result. This ensures a safe switching-over of the operational amplifier. The difference between the voltages ΔUR1 and ΔUR2 on the one hand and between ΔUR1' and ΔUR2 on the other hand is sufficiently large to ensure a sufficient safety zone, and which will be sufficient even when elements with normal tolerances are used and when the lower limit of the admissible supply voltage is reached. Thus, the indicator lamp will only be lighted if one of the lamps or both have actually failed.

The monitoring device shown in FIG. 1 comprises a malfunction simulating arrangement for testing the operativeness of the monitoring device. This malfunction simulating arrangement comprises a diode D1 and a switch SW1 connected in series therewith to the negative terminal. The anode of diode D1 is connected with the "+" input of the operational amplifier OP and its cathode is connected with one contact of switch SW1 which is open at its inoperative position.

When the switch SW1 is closed, the "+" input of the operational amplifier OP is substantially at negative terminal voltage, the output of the operational amplifier is negative, transistor T is thus in its conductive state and indicator lamp A is lighted. Actuation of switch SW1 thus performs the same function as if no voltage drop would be present at resistor R1.

A second switch SW3 is connected in parallel with switch SW1; such second switch SW3 is operated by the ignition switch or ignition key (not shown) of the motor vehicle and is closed when the ignition is switched off. When the switch S is closed, i.e. with the illumination of the motor vehicle switched on, the indicator lamp A is lighted when the ignition is switched off. This draws the attention of the driver to the fact that he has forgotten to switch off the lights of his motor vehicle.

For monitoring the supply voltage, i.e. for testing whether power is actually applied by means of light switch S, the monitoring device shown in FIG. 1 further comprises a manually actuated switching device SW2 which is open in its inoperative position and having one contact connected with the negative terminal and its other contact connected with the base electrode of transistor T through a diode D2 mounted in forward direction and through a resistor R6.

When switch SW2 is closed a bias current flows from negative terminal through diode D2 to the base-emitter junction of transistor T and the indicator lamp A is lighted. For testing whether the supply voltage is present at the monitoring device the switch SW2 is thus momentarily actuated.

A diode SD is connected in parallel with the measuring resistor R1. The purpose of this diode is to limit the potential or voltage drop at measuring resistor R1 to a value insuring that the measuring resistor will not be damaged by overload. When a short circuit occurs in one of the conductors leading to the lamps to be monitored, an increased current will result. Thus, a correspondingly increased potential drop will be generated at measuring resistor R1. Upon prolongated occurrence of such short circuit, the resistor will be excessively heated by the overload and damaged. In normal operation, thus without any malfunction of the monitoring device, the potential drop ΔUR1 at measuring resistor R1 is below the current conducting threshold voltage of the diode SD which is connected in its forward direction. Therefore, only a negligible leakage current will flow through this diode SD.

However, as soon as the potential drop at resistor R1 increases, e.g. due to a short circuit, the threshold voltage of diode SD is exceeded and the diode assumes its contacting state. Due to the well known characteristic of a diode, the potential drop at measuring resistor R1 is limited to a value substantially corresponding to the threshold voltage of the diode SD. This threshold voltage is selected to be in excess of the potential drop generated at measuring resistor R1 in case of normal operation, i.e. without the occurrence of any malfunction, but to be sufficiently low to insure that measuring resistor R1 will not be overloaded. In FIG. 1, only one diode SD is shown. However, a plurality of diodes, e.g. three diodes, may be connected in parallel with each other. This is advantageous because of the reduced power dissipation in each individual diode.

The unit B shown in FIG. 3 comprises five monitoring units E1 through E5 which, as indicated by a dotted line 1, are housed in a common housing. Each monitoring unit is generally of the same construction as the monitoring device shown in FIG. 1. However, to the difference, a further resistor R5 is provided in series with resistors R2, R3, and the anode of diode D1 is not connected with the "+" input of the operational amplifier OP but with the junction between resistor R3 and resistor R5. Further, to the difference from FIG. 1, no possibility of testing the supply voltage is provided, and the diodes D2 are respectively connected at their anodes to the collector electrode of transistor T1, whereas the cathodes thereof are respectively connected with each other. Still further, the measuring resistor R1 is formed as a parallel connection of three individual resistors in order to adapt the measuring resistor to the high operating power of the headlight lamps.

For each monitoring unit E1, . . . E5 the unit B comprises terminals 3 for light switches S1, . . . S4, one terminal o for each lamp circuit to be monitored and one control output terminal m for each display or indicator means. The monitoring unit E1 comprises, additionally, a second control output terminal u which is connected through a diode D3 with the "+" input of the operational amplifier OP inside the unit. Further, the unit B comprises a control output terminal u' common to all of the monitoring units and intended for a common indicator means A, to which the cathodes of diodes D2 are respectively connected. Further, the unit B comprises a control terminal u'' common to all of the monitoring units and intended for the malfunction simulating arrangement, to which the cathodes of diodes D1 are respectively connected. The negative terminal is applied to the monitoring units E1, . . . E5 through a further common terminal u'''.

The external mounting of the unit B is shown outside the dotted line 1. The incandescent lamps to be monitored are connected with the terminals indicated at o. The common indicator lamp A is connected with the common control output u'. The switch SW1 for the simulation of malfunctions is connected with the common control input u''. The indicator lamp A is lighted each time one of the connected incandescent lamps fails or switch SW1 is actuated.

If incandescent lamps with relatively high power are connected with the indicator unit E1, e.g. 55 Watts, respectively, the switching point of the operational amplifier OP is altered by connecting the cathodes of diodes D1, D3 with each other through an external bridge 2 connected to terminals u and $u_1$. Thus, without external bridge 2, only R5 will be shunted by D1 when switch SW1 is closed. When bridge 2 is inserted, D3 will shunt the series connection of resistors R3 and R5 when switch SW1 is closed.

The units B shown in FIGS. 4 through 6 correspond with the unit of FIG. 3. The external mountings and inner mountings of the unit B are respectively different.

The outer mounting of FIG. 4 provides one indicator lamp A1, . . . A5 for each lamp circuit which is monitored. Upon actuation of switch SW1 all those indicator lamps are lighted the monitoring units of which are supplied with current through light switches S1, . . . S4.

In the mounting of FIG. 5, one monitoring lamp C1, . . . C5 is mounted in parallel to each incandescent lamp to be monitored. These monitoring lamps show that no lead interruption is present up to the output of the monitoring device, e.g. that the respective light is actually switched on. As with the embodiment of FIG. 4, each lamp circuit has its own indicator lamp A1, . . . A5.

In case of the external mounting of unit B shown in FIG. 6, an individual indicator lamp A1, . . . A5 is provided for each lamp circuit. Additionally, as is the case with the mounting shown in FIG. 1, testing of the supply voltage up to the output of the monitoring device is provided. To this end, a two step actuating arrangement 4 is provided for switches SW1, SW2. At the first step only switch SW2 is actuated, at the second step only switch SW1, and in inoperative state none of both switches. When the actuating arrangment is operated up to the first step and switch SW2 is closed, a biasing current flows to the transistors T through a current limiting resistor R6 and the diodes D2, so that all those indicator lamps A1, . . . A5 are lighted whose monitoring units E1, . . . E5 are supplied with power through light switches S1, . . . S4. If the actuating arrangement is operated up to the second step, switch SW2 is opened and switch SW1 is closed. Through switch SW1, the negative terminal voltage is then applied to the cathodes of the diodes D1 so that in each monitoring unit, a malfunction is simulated and all those indicator lamps A1, . . . A5 are lighted for those monitoring units E1, . . . E5 which are supplied with power by switches S1, . . . S5.

Suitably, the indicator lamps A1, . . . A5 are arranged in the field of vision of the driver of the vehicle in accordance with the incandescent lamps which are monitored, e.g. the indicator lamps for dim lights at the extreme left, the tail-lights back at the extreme right and the brake lights and fog lamps therebetween. By pushing the common actuating arrangement in the embodiment shown in FIG. 6, at the first switching step, the driver is provided with an information as to whether all lamps are properly switched on and, at the second switching step, as to whether any failure is present in the monitoring system.

With little additional expense, the monitoring device disclosed may be completed so that in case of defective brake lights the malfunction indication is not lost after having operated the brakes but is prolongated until the ignition is switched off. To this end, for example, a conventional latching circuit, time delay circuit etc. may be used.

In order to comply with the requirements mentioned at the outset under (h), the monitoring device is provided with a fuse Si in the bridge branch of FIG. 1 formed by the measuring resistor R1 and the lamps L1, L2, such fuse being formed as a connection wire between the measuring resistor and the lamps. The fuse Si responds upon overload so that a failure indication will result. FIG. 7 shows a preferred external mounting of the monitoring device. In order to monitor the conductors leading to the lamps including the lamp operating switches up to the output of the monitoring device, additional lamps C1, . . . C5 are required in the embodiment of FIG. 5. With the embodiment of FIG. 7, these lamps may be omitted. The terminals 3 are directly connected with the positive terminal of the supply voltage, and the light switches S1 through S4 are respectively connected between the associated lamp and the associated measuring resistor. Thus, the monitoring device is continuously supplied with the supply voltage. In addition, the operational amplifier is connected in such a way that the indicator lamp A will be lighted when a normal voltage drop is generated at the associated measuring resistor and will not be lighted in case of absence of or excessively low voltage drop. In this case, the non-inverting "+" input of the operational amplifier is connected with the measuring resistor R1 and the inverting "−" input is connected with the junction between resistor R2 and resistor R3.

In the embodiment shown at FIG. 7, switches S1 through S4 may also be arranged between the positive terminal of the supply voltage and the measuring resistor without affecting the possibility of monitoring these switches.

A particular advantage of the embodiment shown in FIG. 7 is that the user is always provided with a positive indication of the proper operation of the lamp monitored and of the associated conductors including fuses and light switch without requiring additional monitoring lamps. Should any indicator lamp associated with a lamp circuit to be monitored and which is swtiched on not be lighted, this would mean that a failure or malfunction has occurred.

What is claimed is:

1. In a device for monitoring lamps, in particular lamps of motor vehicles, comprising a measuring resistor connected in series with a lamp to be monitored and means for monitoring the potential drop at the measuring resistor, said monitoring means comprising an operational amplifier and said monitoring device comprising indicator means controlled by said operational amplifier for providing an indication in case of absence of or excessively low potential drop at said resistor, the improvement wherein said operational amplifier comprises a first input and a second input, said first input connected with the junction between said measuring resistor and said lamp to be monitored, and wherein said monitoring means comprises a voltage divider including a first ohmic resistor connected in series with a second ohmic resistor, said series connection of said first ohmic resistor and said second ohmic resistor being connected in parallel with the serial connection of said measuring resistor and said lamp to be monitored, and said second input of said operational amplifier being connected with the junction between said first ohmic resistor and said second ohmic resistor.

2. Monitoring device of claim 1, wherein a malfunction simulating arrangement connected between one of said inputs of said operational amplifier and one terminal of the supply voltage is provided for testing the operativeness of said monitoring device.

3. Monitoring device of claim 2, wherein said malfunction simulating arrangement comprises a diode, a switch connected in series with said diode, said serially connected switch and diode being connected between said one terminal of the supply voltage and said one input of said operational amplifier.

4. Monitoring device of claim 1, wherein an electronic switch controlled by the output of said operational amplifier is provided between said operational amplifier and said indicator means.

5. Monitoring device of claim 4, wherein said electronic switch is controllable by switching means which may be manually operated, for testing the supply voltage.

6. Monitoring device of claim 1, wherein a plurality of said monitoring means are combined in a constructional unit for monitoring a plurality of incandescent lamps with separate current circuits.

7. Monitoring device of claim 6, wherein each of said monitoring means includes a failure simulating arrangement for testing the operativeness of said monitoring device and having one control input, and wherein the control inputs of several failure simulating arrangements are connected with a common operating switch.

8. Monitoring device of claim 6, wherein each monitoring means has one output for controlling the indicator means and said control outputs of said monitoring means are respectively connected through a diode to a common control output for a common indicator means.

9. Monitoring device of claim 6, wherein for each of said monitoring units said constructional unit has one terminal for a light switch, one terminal for a lamp circuit to be monitored, one control output for an indicator means as well as one control terminal common to the monitoring units and intended for said failure simulating arrangements, and a control output for a common indicator means.

10. Monitoring device of claim 3, wherein said voltage divider includes a series resistor, said diode connects between said series resistor and a resistor of said voltage divider, and wherein a further diode for forming a second control input is connected directly with one input of said operational amplifier.

11. Monitoring device of claim 3, comprising in addition a switching means connected between said one terminal of the supply voltage and the output of said operational amplifier, a common two-step operating means connected to said switch of said malfunction simulating means and also connected to said switching means, said switch being closed by said operating means at the first step for malfunction testing and said switching means being closed by said operating means at the second step for testing the supply voltage.

12. Monitoring device of claim 11, wherein said switching means comprises a second switch and a resistor serially connected to said second switch.

13. Monitoring device of claim 1, wherein a fuse is interconnected between the junction of said measuring resistor and one of said inputs of said operational amplifier and said incandescent lamp.

14. The improvement of claim 1, wherein said motor vehicle comprises a power supply voltage, a lamp operating switch serially connected with said lamp to be monitored, said serial connection of said lamp operating switch and lamp being connected between said measuring resistor and one terminal of said supply voltage, and said monitoring device is connected between the positive and the negative terminals of said power supply voltage to be thereby energized and operative independently of the switching state of said lamp operating switch.

15. The improvement of claim 1, wherein said monitoring means comprises switch means operated by an ignition switch of said motor vehicle, said switch means, in the switched-off position of said ignition switch, connecting one of said inputs of said operational amplifier with a potential of such level as to bias said operational amplifier to its state driving said indicator means to generate said indication.

16. The improvement of claim 1, wherein at least one diode is connected in parallel with said measuring resistor, said diode limiting the voltage drop at said measuring resistor in the forward direction of said diode.

17. The improvement of claim 16, wherein a plurality of diodes is connected in parallel with said measuring resistor.

18. The improvement of claim 16, wherein said diode has a current conducting threshold voltage in its forward direction which is in excess of the voltage drop generated at said measuring resistor without the presence of any malfunction.

* * * * *